(12) United States Patent
Ball et al.

(10) Patent No.: US 10,795,839 B1
(45) Date of Patent: Oct. 6, 2020

(54) SYSTEMS AND METHODS FOR CREATING PIPELINE PATHS

(71) Applicant: Palantir Technologies Inc., Palo Alto, CA (US)

(72) Inventors: Eliot Ball, London (GB); Eoin Morgan, Palo Alto, CA (US); Mikhail Proniushkin, New York, NY (US); Meghan Nayan, New York, NY (US); Nadia Saleh, Brooklyn, NY (US); Shilpa Balaji, San Ramon, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 23 days.

(21) Appl. No.: 16/362,391

(22) Filed: Mar. 22, 2019

Related U.S. Application Data

(60) Provisional application No. 62/783,664, filed on Dec. 21, 2018.

(51) Int. Cl.
*G06F 13/20* (2006.01)

(52) U.S. Cl.
CPC ...... *G06F 13/20* (2013.01); *G06F 2213/0064* (2013.01)

(58) Field of Classification Search
None
See application file for complete search history.

(56) References Cited

U.S. PATENT DOCUMENTS

| | | | | |
|---|---|---|---|---|
| 9,355,458 | B2* | 5/2016 | Ihara | A61B 5/08 |
| 2003/0128231 | A1* | 7/2003 | Kasriel | G06Q 30/02 |
| | | | | 715/736 |
| 2004/0267980 | A1* | 12/2004 | McBrearty | G06F 13/102 |
| | | | | 710/38 |
| 2007/0061274 | A1* | 3/2007 | Gipps | G06Q 10/04 |
| | | | | 705/400 |
| 2010/0115276 | A1* | 5/2010 | Betouin | H04L 9/3236 |
| | | | | 713/169 |
| 2018/0219752 | A1* | 8/2018 | Wang | G06F 16/24 |

* cited by examiner

*Primary Examiner* — Elias Mamo
(74) *Attorney, Agent, or Firm* — Sheppard Mullin Richter & Hampton LLP

(57) ABSTRACT

A data pipeline including a plurality of graph pipeline paths is obtained. Each of the graph pipeline paths may include pipeline nodes, at least one of the pipeline node may have at least two inputs. Each of the inputs may comprise outputs of two or more other pipeline nodes. A linear pipeline path interface is provided for creating and presenting a linear pipeline path of the data pipeline. The linear pipeline path may include pipeline nodes, each being limited to a single input and a single output. The linear pipeline path interface may be limited to interacting with linear pipeline paths. A graph pipeline interface is provided for presenting and modifying the data pipeline. The linear pipeline path interface may be switched to the graph pipeline interface in response to a first user input.

15 Claims, 10 Drawing Sheets

SYSTEMS AND METHODS FOR CREATING PIPELINE PATHS

TECHNICAL FIELD

This disclosure pertains to systems for creating pipelines. More specifically, this disclosure pertains to systems for creating pipeline paths.

BACKGROUND

Under conventional approaches, users may view pipelines which include pipeline nodes. Typically, such pipelines include many different pipeline nodes and many different connections between the pipeline nodes. This can cause pipelines to appear cluttered and can make it difficult for users and/or systems to interact with the pipeline and the underlying datasets and/or functions.

SUMMARY

A claimed solution rooted in computer technology overcomes problems specifically arising in the realm of computer technology. In various embodiments, a computing system is configured to obtain a data pipeline including a plurality of graph pipeline paths. The graph pipeline paths may each include a plurality of pipeline nodes, wherein at least one of the pipeline nodes have at least two inputs. The inputs may comprise outputs of two or more other pipeline nodes of the plurality of pipelines nodes. A linear pipeline path interface may be provided for creating and presenting a linear pipeline path of the data pipeline. The linear pipeline path may include a plurality of pipeline nodes, wherein each of the plurality of pipeline nodes is limited to a single input and a single output. The linear pipeline path interface may be limited to interacting with linear pipeline paths (e.g., for performing a linear analysis). The linear pipeline path interface may allow, for example, a user to interact with the data pipeline without having to view or otherwise interact with the entire data pipeline and/or other portions of the data pipeline that are not currently relevant to the user. A graph pipeline interface may be provided for presenting and modifying at least a portion of the data pipeline including at least one graph pipeline path and the linear pipeline path.

In some embodiments, the computing system may switch between the linear pipeline path interface and the graph pipeline interface in response to a user input. For example, a user may create a linear pipeline path and then switch to the graph pipeline interface to view the linear pipeline path in the context of the data pipeline as a whole and/or in part. In another example, a user may create a linear pipeline path and then switch the graph pipeline interface if the user wants to modify the linear pipeline path beyond the limitations of a linear pipeline path (e.g., transition the linear pipeline path to a graph pipeline path in order to provide a pipeline node with multiple inputs).

In some embodiments, the computing system may detect a break in a particular pipeline path of the data pipeline, and dynamically determine one or more alternate pipeline paths of the data pipeline. The particular pipeline path of the data pipeline may be modified based on the one or more alternate pipeline paths of the data pipeline. For example, a pipeline path may include interconnected nodes A, B, and C. An action may, for example, result in node B being deleted, thereby breaking the pipeline path. The system may, for example, identify another pipeline path A, D, C, and then modify (or, "correct") the broken path to effectively connect nodes A and C via node D instead of via node B, which had been deleted.

Various embodiments of the present disclosure include systems, methods, and non-transitory computer readable media configured to obtain a data pipeline including a plurality of graph pipeline paths, each of the plurality of graph pipeline paths including a plurality of pipeline nodes, at least one pipeline node of the plurality of pipeline nodes having at least two inputs, each of the at least two inputs comprising outputs of two or more other pipeline nodes of the plurality of pipelines nodes; providing a linear pipeline path interface for creating and presenting a linear pipeline path of the data pipeline, the linear pipeline path including a plurality of pipeline nodes, each of the plurality of pipeline nodes being limited to a single input and a single output, the linear pipeline path interface being limited to interacting with linear pipeline paths; providing a graph pipeline interface for presenting and modifying at least a portion of the data pipeline, the at least a portion of the data pipeline including at least one graph pipeline path of the plurality of graph pipeline paths and the linear pipeline path; switching from the linear pipeline path interface to the graph pipeline interface in response to a first user input.

In some embodiments, the systems, methods, and non-transitory computer readable media further configured to perform detecting a break in a particular pipeline path of the data pipeline, the particular pipeline path being a particular graph pipeline path of the plurality of graph pipeline paths or the linear pipeline path; dynamically determining one or more alternate pipeline paths of the data pipeline; modifying the particular pipeline path of the data pipeline based on the one or more alternate pipeline paths of the data pipeline.

In some embodiments, the systems, methods, and non-transitory computer readable media further configured to perform presenting the one or more alternate pipeline paths of the data pipeline; receiving a user selection of the particular alternate pipeline path from the one or more alternate pipeline paths of the data pipeline.

In some embodiments, the plurality of pipeline nodes of the linear pipeline path is configured to receive one or more out-of-path inputs in addition the single input.

In some embodiments, the systems, methods, and non-transitory computer readable media further configured to provide a preview any of one or more datasets of a particular node of the linear pipeline path or one or more operations of the particular node of the linear pipeline path in response to a second user input associated with the particular node.

In some embodiments, the systems, methods, and non-transitory computer readable media further configured to provide a mini-map interface presenting a scaled-down representation of a portion of the data pipeline corresponding to a portion of the linear pipeline path.

In some embodiments, the systems, methods, and non-transitory computer readable media further configured to provide an enhanced linear pipeline path interface including the linear pipeline path interface and the mini-map interface.

In some embodiments, the systems, methods, and non-transitory computer readable media further configured to perform receive a third user input indicating a particular out-of-path input for the particular node of the linear pipeline path, the particular out-of-path input comprising an output of a node in a different linear pipeline path or graph pipeline path of the data pipeline.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

A claimed solution rooted in computer technology overcomes problems specifically arising in the realm of computer technology. In various embodiments, a computing system is configured to obtain a data pipeline including a plurality of graph pipeline paths. The graph pipeline paths may each include a plurality of pipeline nodes, wherein at least one of the pipeline nodes have at least two inputs. The inputs may comprise outputs of two or more other pipeline nodes of the plurality of pipelines nodes. A linear pipeline path interface may be provided for creating and presenting a linear pipeline path of the data pipeline. The linear pipeline path may include a plurality of pipeline nodes, wherein each of the plurality of pipeline nodes is limited to a single input and a single output. The linear pipeline path interface may be limited to interacting with linear pipeline paths (e.g., for performing a linear analysis). The linear pipeline path interface may allow, for example, a user to interact with the data pipeline without having to view or otherwise interact with the entire data pipeline and/or other portions of the data pipeline that are not currently relevant to the user. A graph pipeline interface may be provided for presenting and modifying at least a portion of the data pipeline including at least one graph pipeline path and the linear pipeline path.

In some embodiments, the computing system may switch between the linear pipeline path interface and the graph pipeline interface in response to a user input. For example, a user may create a linear pipeline path and then switch to the graph pipeline interface to view the linear pipeline path in the context of the data pipeline as a whole and/or in part. In another example, a user may create a linear pipeline path and then switch the graph pipeline interface if the user wants to modify the linear pipeline path beyond the limitations of a linear pipeline path (e.g., transition the linear pipeline path to a graph pipeline path in order to provide a pipeline node with multiple inputs).

In some embodiments, the computing system may detect a break in a particular pipeline path of the data pipeline, and dynamically determine one or more alternate pipeline paths of the data pipeline. The particular pipeline path of the data pipeline may be modified based on the one or more alternate pipeline paths of the data pipeline. For example, a pipeline path may include interconnected nodes A, B, and C. An action may, for example, result in node B being deleted, thereby breaking the pipeline path. The system may, for example, identify another pipeline path A, D, C, and then modify (or, "correct") the broken path to effectively connect nodes A and C via node D instead of via node B, which had been deleted.

Figure 1:
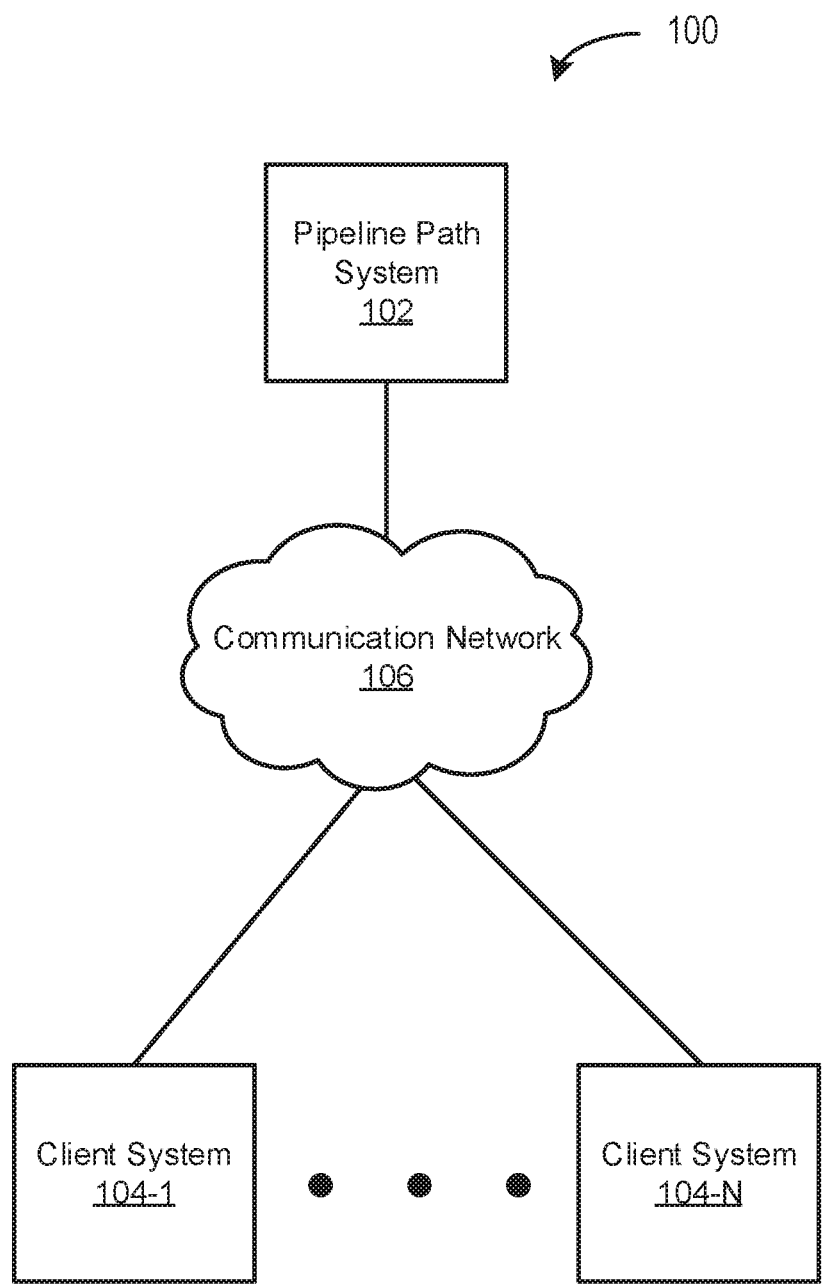
FIG. 1 depicts a diagram of an example system for creating and visualizing pipelines and pipeline paths according to some embodiments.

FIG. 1 depicts a diagram 100 of an example system for dynamically generating and presenting pipelines (or, pipeline "visualizations") according to some embodiments. In the example of FIG. 1, the system includes a pipeline path system 102, client systems 104-1 to 104-N (individually, the client system 104, collectively, the client systems 104), and a communication network 106.

The pipeline path system 102 may function to manage (e.g., create, read, update, delete) pipelines. A pipeline may include a set of nodes with connections (e.g., "edges") between nodes(s), where the output of one node is the input of a next node. A node may represent one or more datasets (e.g., tabular datasets, object-based datasets) and/or one or more functions providing operations to be performed on one or more datasets (e.g., the datasets represented by the node). Operations may include modification operations (e.g., filtering operations, transformation operations) and/or visualization operations. In various embodiments, functionality of the pipeline path system 102 may be performed by one or more servers (e.g., a cloud-based server) and/or other computing devices (e.g., desktop computers, laptop computers, mobile devices, and/or the like).

In some embodiments, a pipeline may be a data pipeline, a software deployment pipeline (e.g., continuous integration pipeline, and/or continuous deployment pipeline), and/or the like. A pipeline may include one or more pipeline paths (or, simply, "paths"). A path may include multiple nodes and connections between nodes, and different paths may be executed sequentially, in parallel, and/or otherwise. In some embodiments, a path itself may be a pipeline. Accordingly, as used herein, the term "pipeline" may refer to a collection of paths and/or particular path(s) within a larger pipeline. Additionally, the term "pipeline" may refer to the underlying set of operations, datasets, and/or the like, and/or it may refer to a representation thereof (e.g., a graphical representation of nodes, connections, and/or the like).

In some embodiments, the pipeline path system 102 may function to generate a graph pipeline interface for managing graph pipeline paths. A graph pipeline path may be a particular type of pipeline path. A graph pipeline path may include, and/or be defined by, one or more constraints. Constraints, as used herein, may be values (e.g., maximum values, minimum values), ranges, thresholds, and/or the like, indicating a number of node inputs, number of node outputs, types of datasets (e.g., tabular data, object-oriented data), types of functions (e.g., modification functions, visualization functions), and/or the like. In some embodiments, the constraints may define values, ranges, and/or thresholds associated with an undirected (or, simple) graph, a directed graph, an acyclic graph, and/or the like. For example, a node in a graph pipeline path may have one or more inputs, one or more outputs, one or more associated edges, and/or the like.

In some embodiments, the pipeline path system 102 functions to generate a linear pipeline interface for managing linear pipeline paths. A linear pipeline path may be a particular type of pipeline path that includes, and/or is defined by, constraints. For example, a linear pipeline path may constrain (or, "limit") node inputs to a single input per node and/or a single output per node. The linear pipeline interface may provide an interface that is easy to access, view, and/or utilize, and is not cluttered with entire pipelines, graph pipeline paths, and/or the like. For example, if a user wants to create and/or perform a linear analysis, the user may create a linear pipeline path without having all of the options and/or clutter associated with an entire pipeline and/or graph pipeline path.

The client systems 104 may function to present pipelines and/or interact with pipelines. For example, a client system 104 may display one or more GUIs including pipelines having graph pipeline paths, linear pipeline paths, and/or the like. In various embodiments, some or all of the functionality of the pipeline path system 104 may be performed by a client system 104, and/or vice versa. Similarly, the pipeline path system 102 and clients system 104 may cooperate to perform some or all of the functionality described herein. For example, the pipeline path system 102 may provide back-end functionality and the client systems 104 may provide front-end functionality for some or all of the features described here. In some embodiments, functionality of the client systems 104 may be performed by one or more desktop computers, laptop computers, mobiles devices, servers and/or other computing devices.

The communications network 106 may represent one or more computer networks (e.g., LAN, WAN, or the like) or other transmission mediums. The communication network 106 may provide communication between the pipeline path system 102, client systems 103, and/or other engines, datastores, and/or components described herein. In some embodiments, the communication network 106 includes one or more computing devices, routers, cables, buses, and/or other network topologies (e.g., mesh, and the like). In some embodiments, the communication network 106 may be wired and/or wireless. In various embodiments, the communication network 106 may include the Internet, one or more wide area networks (WANs) or local area networks (LANs), one or more networks that may be public, private, IP-based, non-IP based, and so forth.

Figure 2:
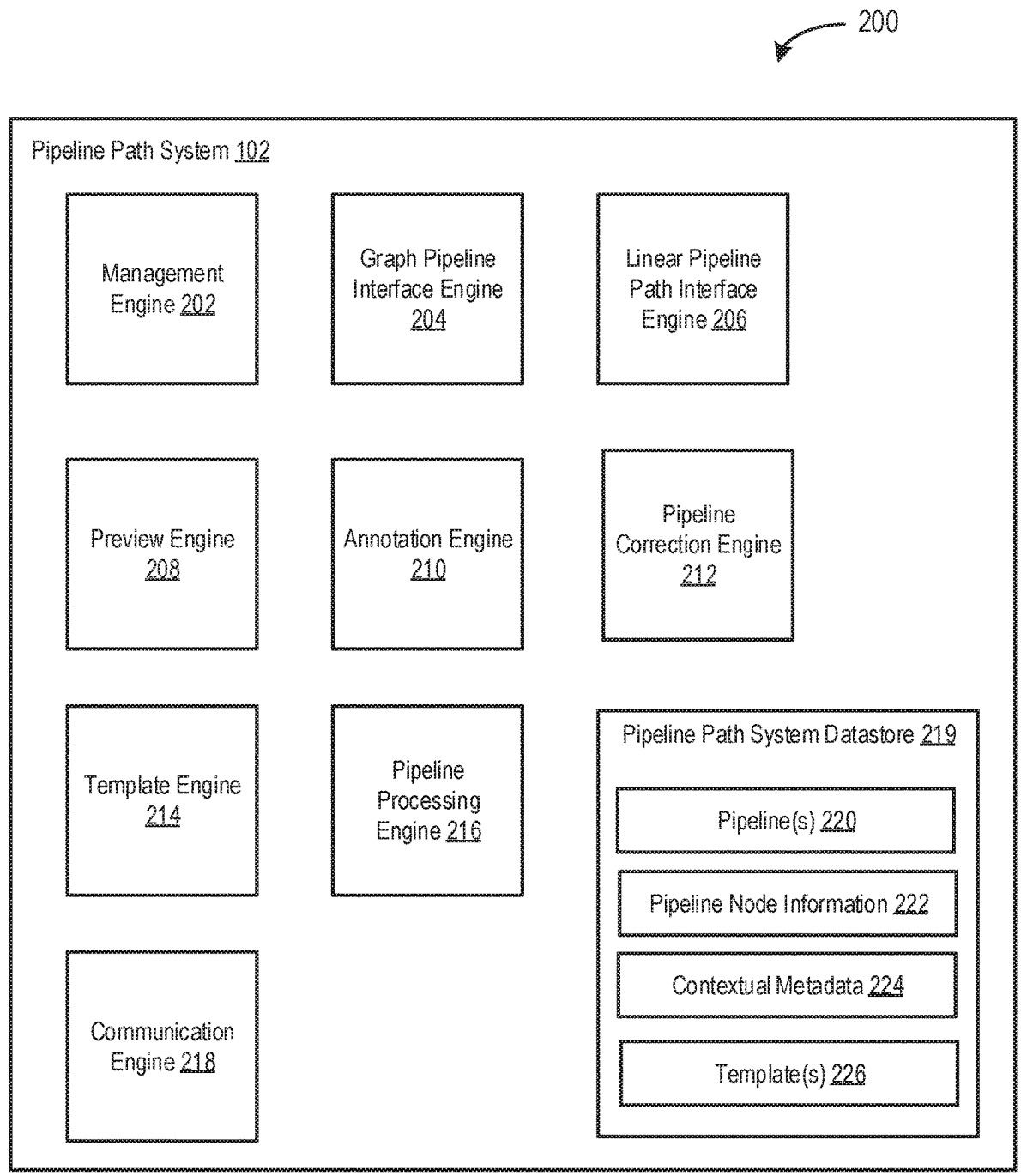
FIG. 2 depicts a diagram of an example of a pipeline path system according to some embodiments.

FIG. 2 depicts a diagram 200 of an example of a pipeline path system 102 according to some embodiments. In the example of FIG. 2, the pipeline path system 102 includes a management engine 202, a graph pipeline interface engine 204, a linear pipeline interface engine 206, a preview engine 208, an annotation engine 210, a pipeline correction engine 212, a template engine 214, a pipeline processing engine 216, a communication engine 218, and a prebuilt components datastore 219.

The management engine 202 may function to manage (e.g., create, read, update, delete, or otherwise access) pipeline(s) 220 stored in the pipeline path system datastore 219, pipeline node information 222 stored in the pipeline path system datastore 219, contextual information 224 stored in the pipeline path system datastore 219, pipeline template(s) 226, and/or other data stored in the pipeline path system datastore 219 and/or other datastores. The management engine 202 may perform any of these operations manually (e.g., by a user interacting with a GUI) and/or automatically (e.g., triggered by one or more of the engines 204-218). Like other engines described herein, some or all of the functionality of the management engine 202 may be included in one or more other engines (e.g., engines 204-218).

In some embodiments, the management engine 202 functions to obtain one or more pipelines 220. A pipeline 220 may include multiple connected nodes, and each of the nodes may be associated with pipeline node information 222. Pipeline node information 222 may include functions and/or datasets, and/or references thereto. Accordingly, a pipeline 220 may provide one or more functions for providing operations (e.g., modification operations or visualization operations) on a plurality of datasets.

In some embodiments, a pipeline 220 may include one or more pipelines of operations. A pipeline of operations may include one or more functions. For example, the functions may provide one or more modification operations and/or visualization operations that may be performed on one or more portions of data. Modification operations may include preparing data (e.g., cleaning data, normalizing data, filtering data), building binaries and/or objects, software deployment functions (e.g., continuous integration functions, continuous deployment functions), and/or the like. Visualization functions may include generating graphical representations (e.g., plots, tables, graphs, maps, charts) of data and/or other graphical user interfaces. The pipeline of operations may define an order in which the functions are applied to data. The pipeline of operations may include a linear pipeline or a branching pipeline.

In some embodiments, a function may refer to one or more groupings of code that perform one or more specific operations on data. A set of functions may refer to a grouping of one or more functions. Operations on data may include processes that modify the data (e.g., change the data, create new data based on the data, delete the data, combine the data with other data), processes that visualize the data (e.g., in a plot, in a table, in a chart, in a map), and/or other operations of the data. In some embodiments, functions may be specific to the data (e.g., the type of data accessed), the user (e.g., the type of user, user's privilege level), and/or other information. The functions may be selected by users to generate one or more pipelines of operations on the data.

The graph pipeline interface engine 204 may function to generate a graph pipeline interface for creating a pipeline 220 including graph pipeline paths and/or linear pipeline paths. For example, a pipeline 220 may be updated/modified when users select a new function for inclusion in the pipeline 220. The pipeline may be updated/modified when users remove a function from the pipeline. The pipeline of operations may be updated/modified when users change the ordering of functions within the pipeline.

The linear pipeline interface engine 206 may function to generate a linear pipeline path interface for creating linear pipeline paths. For example, a pipeline 220 may be updated/ modified when users select a new function for inclusion in the pipeline 220. The pipeline may be updated/modified when users remove a function from the pipeline. The pipeline of operations may be updated/modified when users change the ordering of functions within the pipeline.

In some embodiments, the linear pipeline path interface engine 206 provides and/or enforces constraints of a linear pipeline path. For example, the linear pipeline path interface may permit users to create only linear pipeline paths within the linear pipeline path interface. If the user wishes to perform an action outside the scope of such constraints (e.g., provide multiple inputs to a single node), the linear pipeline path interface engine 204 may automatically and/or in response to user input switch to a graph pipeline path interface, and/or indicate an error and not allow the action.

In some embodiments, the linear pipeline interface engine 206 may function to generate a mini-map interface. For example, while the linear pipeline path interface provides a simplified and less cluttered view relative to a presentation of an entire pipeline, it may be useful to have the context of the pipeline when interacting with a linear pipeline path interface. Accordingly, the linear pipeline interface engine 206 may present a mini-map including a context-specific portion of the pipeline in a view that is usable (e.g., readable) and that may be dynamically updated (e.g., in real-time and/or based on user input). For example, the mini-map may include the portion of the pipeline that includes a selected node in a centered position of the mini-map, and a predetermined number of node(s) preceding the centered node and/or a predetermined number of node(s) following the centered node. The centered node may be selected in response to a user selecting that particular node (e.g., in the linear pipeline path interface). For example, as a user is creating a linear pipeline path in the linear pipeline path interface, the changes to the overall pipeline may be reflected in real-time in the mini-map interface.

Figure 4:
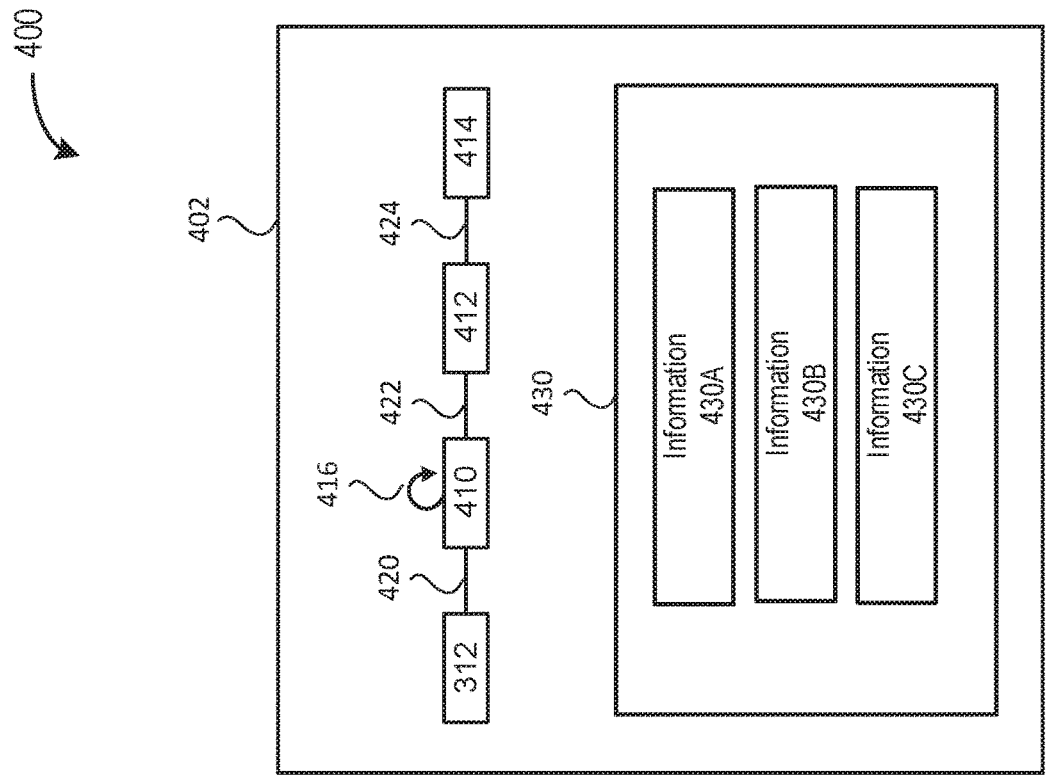
FIG. 4 depicts a diagram of an example of a linear pipeline path interface and a mini-map interface according to some embodiments.
Figure 4:
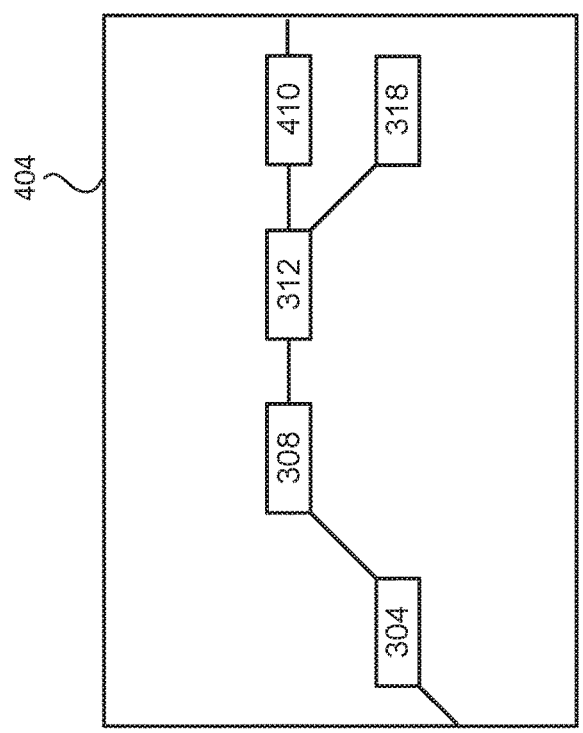

In some embodiments, the mini-map interface maintains one or more spatial relationship properties of a pipeline. For example, nodes of a pipeline may be spaced within various distances of each other in an overall pipeline view (e.g., in a graph pipeline interface, as shown in FIG. 4). As the mini-map representation of the pipeline is scaled down to fit in the mini-map interface, certain aspects of pipeline may be scaled differently. For example, reducing the size of the nodes may make the edges appear longer. Accordingly, the linear pipeline interface engine 206 may scale both the nodes and the edges to maintain the spatial relationships of the overall pipeline in the mini-map.

In some embodiments, the spatial properties of a pipeline may indicate a processing time (e.g., build time, execution time) and/or other computing resource requirements (e.g., memory requirements, processing power requirements, bandwidth requirements) associated with the pipeline, and/or portions thereof. For example, the length of a connection between two nodes may indicate a processing time to perform that portion of the pipeline. Additional spatial properties (e.g., size of nodes, width of connections) may indicate the same or different computing requirements, and/or indicate node information 222. For example, a size of node may indicate a number of associated datasets and/or an amount of data in the associated datasets.

The preview engine 208 may function to present a preview of node information 222 (e.g., functions, datasets) associated with a node. Preview information may presented automatically and/or in response to a user selection (e.g., a mouse-over of a node). Previews may be available in a graph pipeline path interface, a linear pipeline path interface, and/or other interfaces. In some embodiments, the preview engine 208 determines a type of information and/or an amount of information to present for each type of interface. For example, the preview engine 208 may determine the type of information and the amount of information to present for a particular interface based on contextual information 224.

In some embodiments, contextual information 224 is stored as metadata. Contextual information 224 may include usage history (e.g., how often a pipeline and/or pipeline paths are executed overall and/or by particular users or groups of users, how often particular datasets are used/interacted with overall and/or by particular users or groups of users, how often nodes are used), user favorites (e.g., bookmarked pipelines, paths, datasets, functions, nodes), desired objectives (e.g., building a particular object, executing a particular pipeline or path), user privileges, and/or the like. For example, a user may routinely interact with particular datasets, while rarely interacting without other datasets. Accordingly, the preview engine 208 may present the datasets, and/or portions of the datasets (e.g., particular rows and/or columns) that the user routinely uses even if other datasets are viewed more often by other users. Thus, two different users may view the same pipeline 220 but be presented with different information (e.g., node information 222) associated with that pipeline.

The annotation engine 210 may function to provide annotations for pipelines, pipeline paths, and/or pipeline nodes. Annotations may include out-of-path inputs for pipeline nodes and/or graphical icons indicating out-of-path inputs. An out-of-path input may be an input provided from an output of a node that is not in the current path of the receiving node. The out-of-path-input may not be considered as an input for the purpose of input constraints (e.g., a constraint limiting a node to a single input). Accordingly, in some embodiments, a linear pipeline path may allow only a single input from in-path nodes, but allow one or more other out-of-path inputs. This may allow, for example, users to stay within the linear pipeline interface without having to switch to a graph pipeline interface to add an input.

Figure 5A:
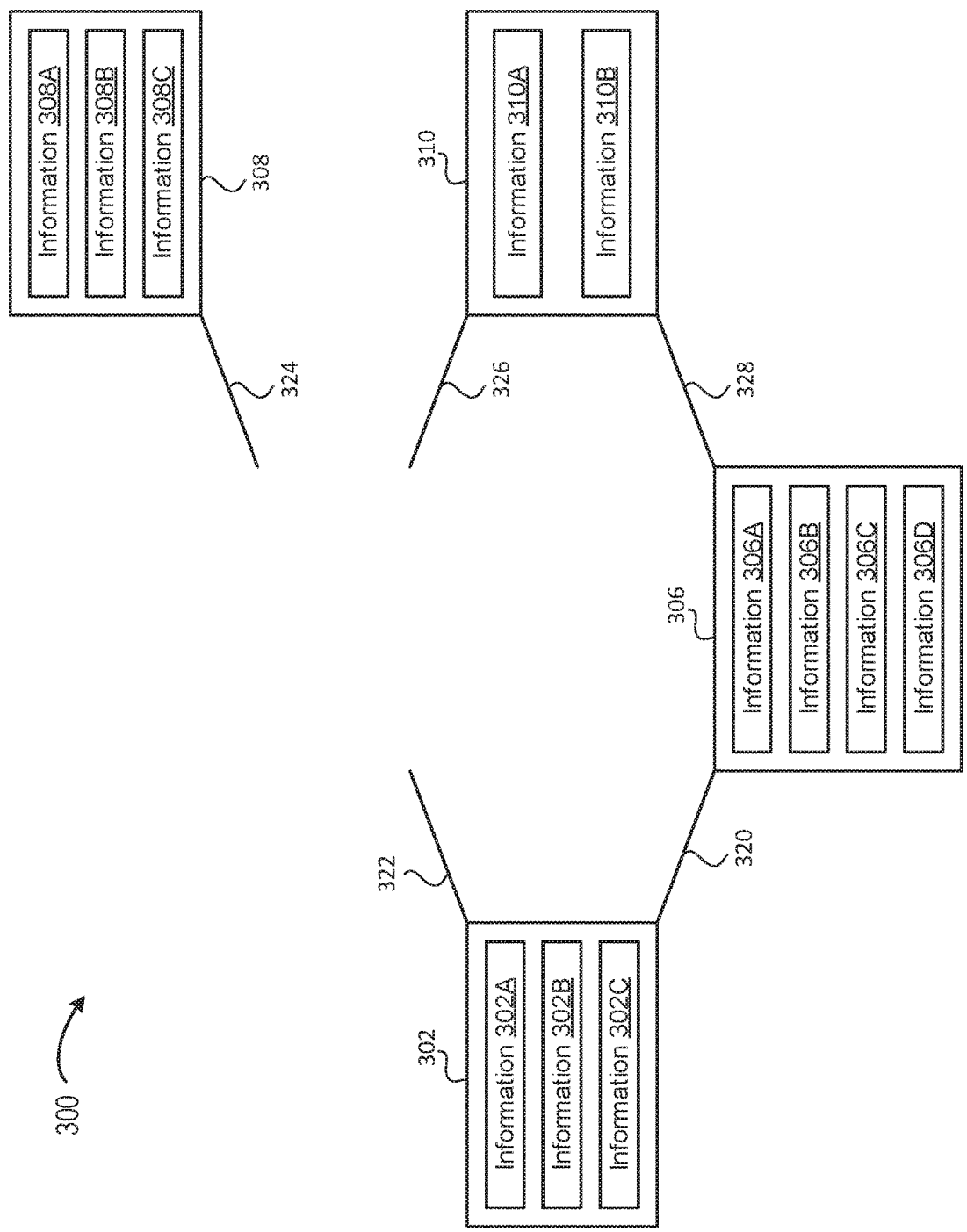
FIG. 5A depicts a diagram of an example of a break in a portion of a pipeline according to some embodiments.

The pipeline correction engine 212 may function to detect breaks in a pipeline. Breaks may occur, for example, in response to user interaction with a pipeline (e.g., deleting nodes, adding nodes, deleting connections, adding connections, changing inputs, changing outputs) and/or pipeline merges. Pipeline mergers may occur in response to a pipeline, and/or pipeline path, being checked-out (e.g., from a version controlled repository). A pipeline may be checked out by multiple users, and when they are checked back in, it may causes conflicts (or, breaks). Accordingly, the pipeline correction engine 212 may analyze a pipeline for breaks in response to users interactions with a pipeline, in response to check-in of a pipeline, and/or the like. For example, the pipeline correction engine 212 may ensure the constraints of the pipeline and/or paths are still intact, and/or identify errors, such as a broken connection between two nodes (e.g., as shown in FIG. 5A).

In some embodiments, the pipeline correction engine 212 functions to correct breaks in a pipeline. For example, the pipeline correction engine 212 may dynamically determine one or more alternate pipeline paths of the data pipeline in response to detecting a break. The particular pipeline path may be modified based on the one or more alternate pipeline paths of the data pipeline. For example, a pipeline path may include interconnected nodes A, B, and C. An action may, for example, result in node B being deleted, thereby breaking the pipeline path. The pipeline correction engine 212 may, for example, identify another path A, D, C, and then modify the broken path to effectively connect nodes A and C via node D instead of via node B, which had been deleted. In some embodiments, the pipeline correction engine 212 may present a set of alternate paths (e.g., including shortest route), and the user may select the best fit, and the pipeline correction engine 212 may update the pipeline accordingly.

The template engine 214 may function to generate, store and/or retrieve templates. Templates may comprise predefined nodes and/or nodes which have not been fully defined. For example, a template may comprise a node with a particular function, but with unspecified inputs. Users may select template nodes (e.g., through some or all of the interfaces described herein), and add the template nodes to a pipeline as if they are creating a new node from scratch, and then define the undefined elements of the template node. In some embodiments, the template engine 214 may function to recommend templates based on contextual information 224.

The pipeline processing engine 216 may function to execute and/or interpret pipelines 220 and/or portions thereof. For example, the pipeline processing engine 216 may perform the functions on the datasets as indicated by the pipeline 220. Executions may be performed on-demand (e.g., based on user input) and/or automatically (e.g., based on a schedule).

In some embodiments, the pipeline processing engine 216 determines spatial relationships of a pipeline. The pipeline processing engine 216 may determine spatial relationships based on computing resource requirements, as discussed elsewhere herein, and/or based on contextual information 224. For example, different users may have different users privileges. A user with higher privileges (e.g., a power user, project manager, administrator) may be given access to more computing resources, which may result in faster processing times for pipeline executions, which may be represented by relatively shorter connections between particular nodes of a pipeline. In some embodiments, if a privilege level changes, and/or other contextual information 224 changes, the pipeline processing engine 216 may update the pipeline visualization accordingly (e.g., in real-time). For example, if a user is viewing a visualization a pipeline, and the user's privileges get increased (e.g., by project manager), particular node connections may become shorter. In another example, when requirements/dependencies changes, that may also be dynamically reflected by shortening or lengthening connections, and/or changing other spatial properties.

The communication engine 218 may function to send requests, transmit and, receive communications, and/or otherwise provide communication with one or a plurality of systems. In some embodiments, the communication engine 218 functions to encrypt and decrypt communications. The communication engine 218 may function to send requests to and receive data from one or more systems through a network or a portion of a network. Depending upon implementation-specific considerations, the communication engine 218 may send requests and receive data through a connection, all or a portion of which may be a wireless connection. The communication engine 218 may request and receive messages, and/or other communications from associated systems. Communications may be stored in the pipeline path system datastore 219.

Figure 3:
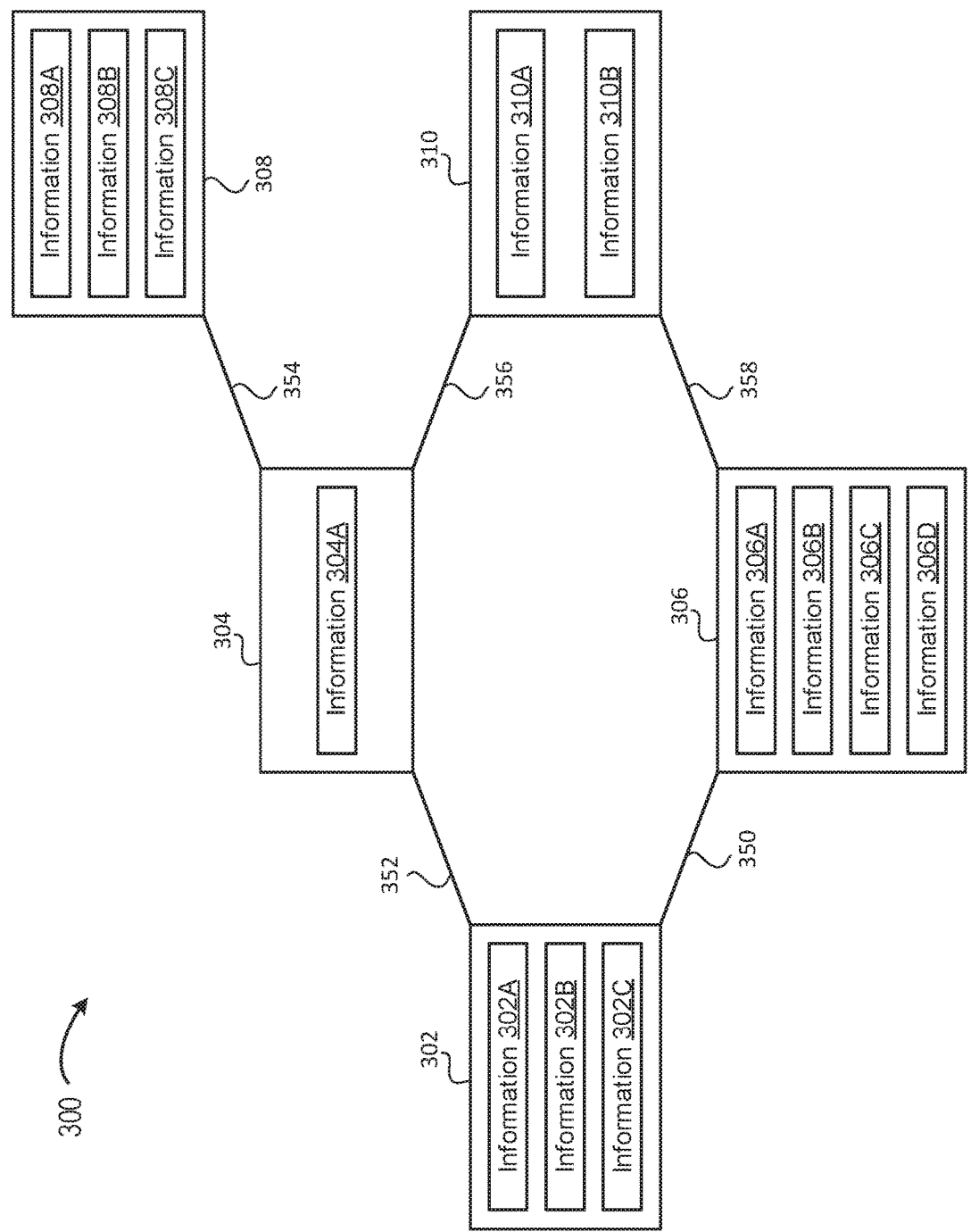
FIG. 3 depicts a diagram of an example of a visualization of a portion of a pipeline according to some embodiments.

FIG. 3 depicts a diagram 300 of an example of a visualization of a portion of a pipeline (e.g., pipeline 220) according to some embodiments. In the example of FIG. 3, the pipeline is presented in a graphical user interface (e.g., a graph pipeline interface) showing node information and connections. More specifically, the nodes 302-310 and the connections 350-358 are shown at a particular scale (e.g., a graph pipeline interface scale which may be larger than a mini-map scale) and include pipeline node information 302A-C, 304A, 306A-D, 308A-C, 310A-B, which may not be present in other representations (e.g., mini-map representations). For example, the pipeline node information (e.g., pipeline node information 222) may include functions, datasets, and/or the like, as discussed elsewhere herein. In some embodiments, a preview engine (e.g., preview engine 208) may determine information to include in the representation of the pipeline.

FIG. 4 depicts a diagram 400 of an example of a linear pipeline path interface 402 and a mini-map interface 404 according to some embodiments. In the example of FIG. 4, the linear pipeline interface 402 includes a linear pipeline path comprising nodes 312 and 410-414, and connections 420-424. For example, the node 312 may have been part of a pipeline prior to entering the linear pipeline interface 402, and the nodes 410-414 and connections 420-424 may have been added in the linear pipeline interface 402. The linear pipeline interface 402 also includes information 430A-C associated with the linear pipeline interface. For example, the information 430A-C may include datasets, operations, and/or the like, associated with a linear analysis.

The mini-map interface 404 may include a scaled (e.g., scaled-down and/or scaled-up) representation of a portion of a pipeline associated with the linear pipeline path presented in the linear pipeline interface 402. For example, a current node (e.g., a selected node) may be node 312, and the mini-map interface 404 may present the two preceding nodes 304, 308 of the pipeline and the two following nodes 410, 318 of the pipeline. It will be appreciated that another predetermined number of nodes (e.g., one preceding and one following) may be presented in the mini-map interface 404. The mini-map interface 404 may also automatically center a currently selected node. For example, the current node 312 is centered, but if a user selects node 410, that node 410 may appear centered in the mini-map interface 404.

In some embodiments, users may interact with the mini-map interface 404 for navigational purposes so that a user can switch between paths to focus on nodes based on selections in the mini-map interface 404. For example, nodes in the mini-map interface 404 that may be part of other paths (e.g., not in a currently selected path) can be clicked (and/or otherwise selected) to allow the user to navigate the particular path. Additionally, the mini-map interface 404 may support functionality for zooming in, zooming out, panning, and/or viewing visualizations and/or previews of nodes, as discussed elsewhere herein.

Figure 5B:
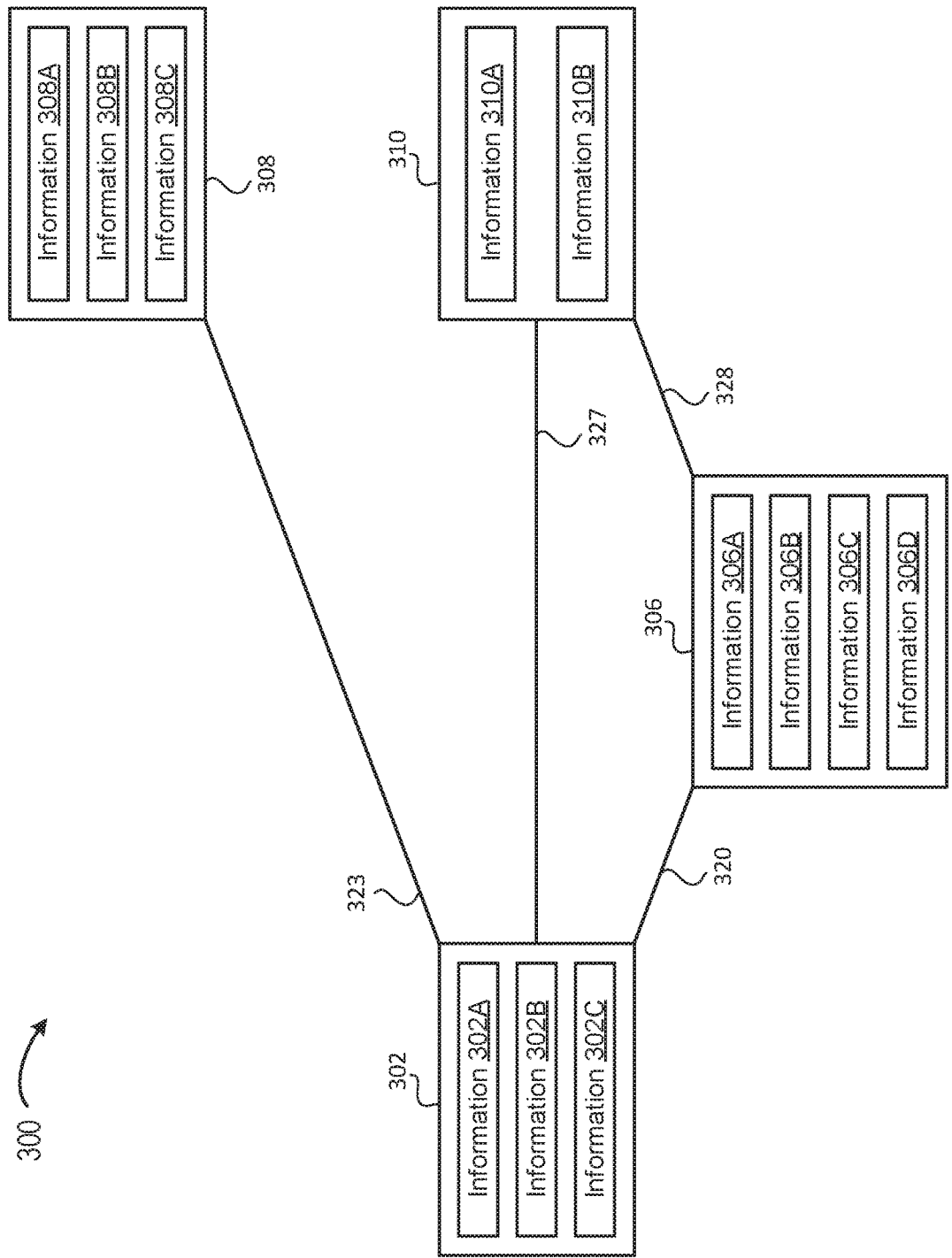
FIG. 5B depicts a diagram of an example of a corrected portion of a pipeline according to some embodiments.

FIG. 5A depicts a diagram 500 of an example of a break in a portion of a pipeline (e.g., pipeline 220) according to some embodiments. In the example of FIG. 5A, node 304 has been removed (e.g., in response to user input). A pipeline path system (e.g., pipeline path system 102) may detect the break caused by the removal of node 304. The pipeline path system may correct the break, for example, as shown in FIG. 5B.

Figure 6:
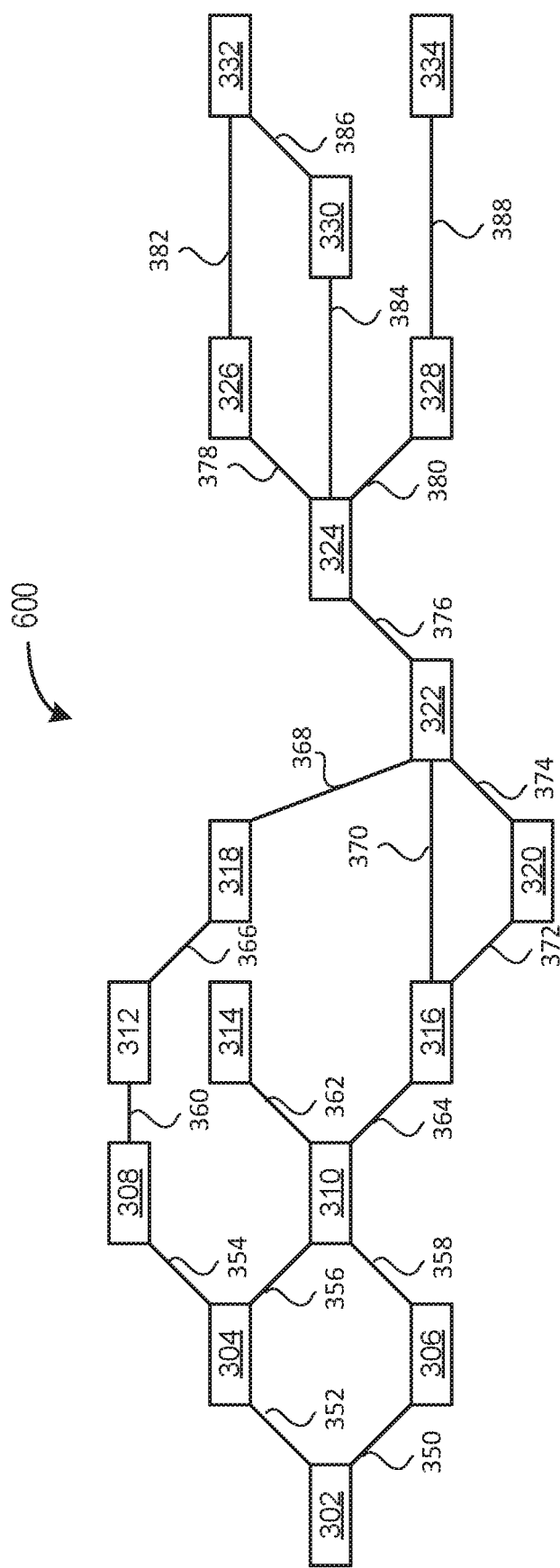
FIG. 6 depicts a diagram of an example visualization of a pipeline 600 according to some embodiments.

FIG. 6 depicts a diagram 600 of an example visualization of a pipeline 600 according to some embodiments. In the example of FIG. 6, a pipeline is generated and presented in a graphical user interface (e.g., a graph pipeline interface). As discussed elsewhere herein, reference to a pipeline may refer to a visualization of a pipeline and/or the pipeline itself. The same may also be true for pipeline paths. The pipeline includes nodes 302-334 and connections 350-386. The pipeline includes various spatial relationships (e.g., distances between nodes), which may indicate a processing time for operations, and/or the like, as discussed elsewhere herein. The pipeline of FIG. 6 may be an overall pipeline of which the other pipelines presented herein (e.g., the pipelines of FIGS. 3-5) may be a part.

Figure 7:
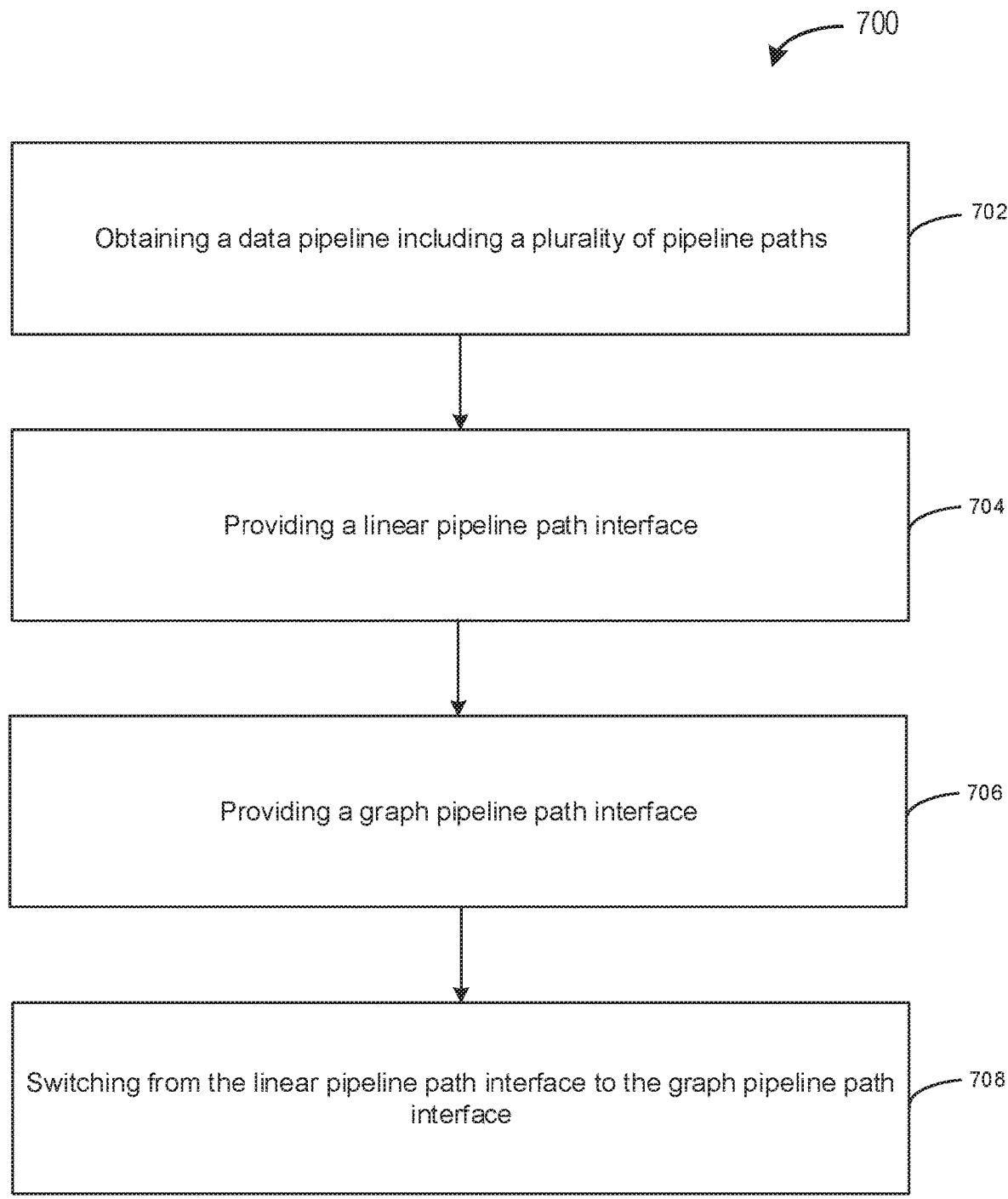
FIG. 7 depicts a flowchart of an example of a method of operation of a pipeline path system according to some embodiments.

FIG. 7 depicts a flowchart 700 of an example of a method of operation of a pipeline path system according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed but may have been included for the sake of illustrative clarity.

In step 702, a pipeline path system (e.g., pipeline path system 102) obtains a data pipeline (e.g., a pipeline 220) including a plurality of graph pipeline paths. Each of the graph pipeline paths may include pipeline nodes. Pipeline nodes may include pipeline node information (e.g., pipeline node information 222). At least one pipeline node of the graph pipeline path may have at least two inputs. The at least two inputs may comprise outputs of two or more other pipeline nodes. In some embodiments, a graph pipeline interface engine (e.g., graph pipeline interface engine 204) and/or management engine (e.g., management engine 202) obtains the data pipeline.

In step 704, the pipeline path system provides (or, generates) a linear pipeline path interface (e.g., interface 404 and/or interface 402) for creating and presenting a linear pipeline path of the data pipeline. The linear pipeline path may include a plurality of pipeline nodes. Each of the plurality of pipeline nodes may be limited to a single input and a single output. The linear pipeline path interface may be limited to interacting with linear pipeline paths. In other embodiments, the pipeline nodes may be otherwise limited. For example, a different number of limited inputs, a different number of a limited outputs, limited node information, and/or the like.

In some embodiments, a linear pipeline interface engine (e.g., linear pipeline interface engine 206) provides the linear pipeline path interface. For example, the linear pipeline interface engine may cooperate with a client system (e.g., client system 104) over a communications network (e.g., communications network 106) to present the linear pipeline interface engine to a user of the client system.

In some embodiments, the linear pipeline path interface includes, and/or the linear pipeline interface engine, generates a mini-map interface for presenting a scaled-down representation of a portion of the data pipeline corresponding to a portion of the linear pipeline path. For example, the linear pipeline path interface may generate an interface comprising a mini-map interface (e.g., mini-map interface 404) and a linear pipeline path interface (e.g., as shown in FIG. 4). A combined interface including a mini-map interface and a linear pipeline path interface may be referred to as an enhanced linear pipeline path interface. As used herein, reference to a linear pipeline path interface may refer to an enhanced linear pipeline path interface and/or a linear pipeline path interface.

In step 706, the pipeline path system provides (or, generates) a graph pipeline path interface (e.g., graph pipeline path interface 300) for presenting and modifying at least a portion of the data pipeline. The at least a portion of the data pipeline may include at least one graph pipeline path of the plurality of graph pipeline paths and the linear pipeline path. For example, the graph pipeline interface engine may include the graph pipeline paths, and one or more linear pipeline paths created using the linear pipeline path interface provided in step 704. In some embodiments, a graph pipeline interface engine (e.g., graph pipeline interface engine 204) provides the graph pipeline path interface.

In some embodiments, the pipeline path system provides (or, generates) a preview of any of one or more datasets of a particular node of the linear pipeline path or one or more operations of the particular node of the linear pipeline path in response to a second user input associated with the particular node. A preview engine (e.g., preview engine 208) may present the preview. For example, the preview may be presented in response to a user selection of a pipeline node and/or user mouse-over of the pipeline node.

In some embodiments, the pipeline and/or pipeline paths created using the linear pipeline path interface and the graph pipeline path interface may create paths for the same and/or different pipeline. For example, there may be single pipeline, and each of the different interfaces may be modifying that pipeline, albeit with different constraints based on the interface. For example, the linear pipeline path interface may be limited to creating linear pipeline paths, and/or other limited pipeline paths, and the graph pipeline path interface may have no restrictions and/or different (e.g., broader) restrictions.

In step 708, the pipeline path system switches from the linear pipeline path interface to the graph pipeline path interface and/or vice versa. For example, a user may begin with a view of a pipeline in the graph pipeline path interface, but only need to create a linear analysis. Accordingly, the pipeline path system may switch (e.g., automatically and/or in response to user input) from the graph pipeline path interface to the linear pipeline path interface. The user may continue to create a linear pipeline path using the linear pipeline path interface. When the user needs to perform additional actions outside the score of the linear pipeline interface (e.g., add a node taking multiple inputs), the pipeline path system may switch to the graph pipeline path interface (e.g., either automatically and/or in response user input). For example, the user may manually instruct the pipeline path system to switch to the graph pipeline path interface, and/or the pipeline path system may switch to the graph pipeline path interface automatically (e.g., in response to the user attempting to add a node with multiple inputs).

In some embodiments, the graph pipeline path interface and/or linear pipeline path interface may function to annotate pipeline nodes. For example, the pipeline path system may mark particular nodes with graphical icons and/or the like. In another example, annotations may include out-of-path inputs and/or graphical icons indicating an out-of-path input (e.g., icon 416). For example, a user may select a pipeline node through a respective interface and indicate an out-of-path input for that node. The out-of-path input may not be included as an input for the purpose of input constraints (e.g., a single input per node for the linear pipeline path interface).

Figure 8:
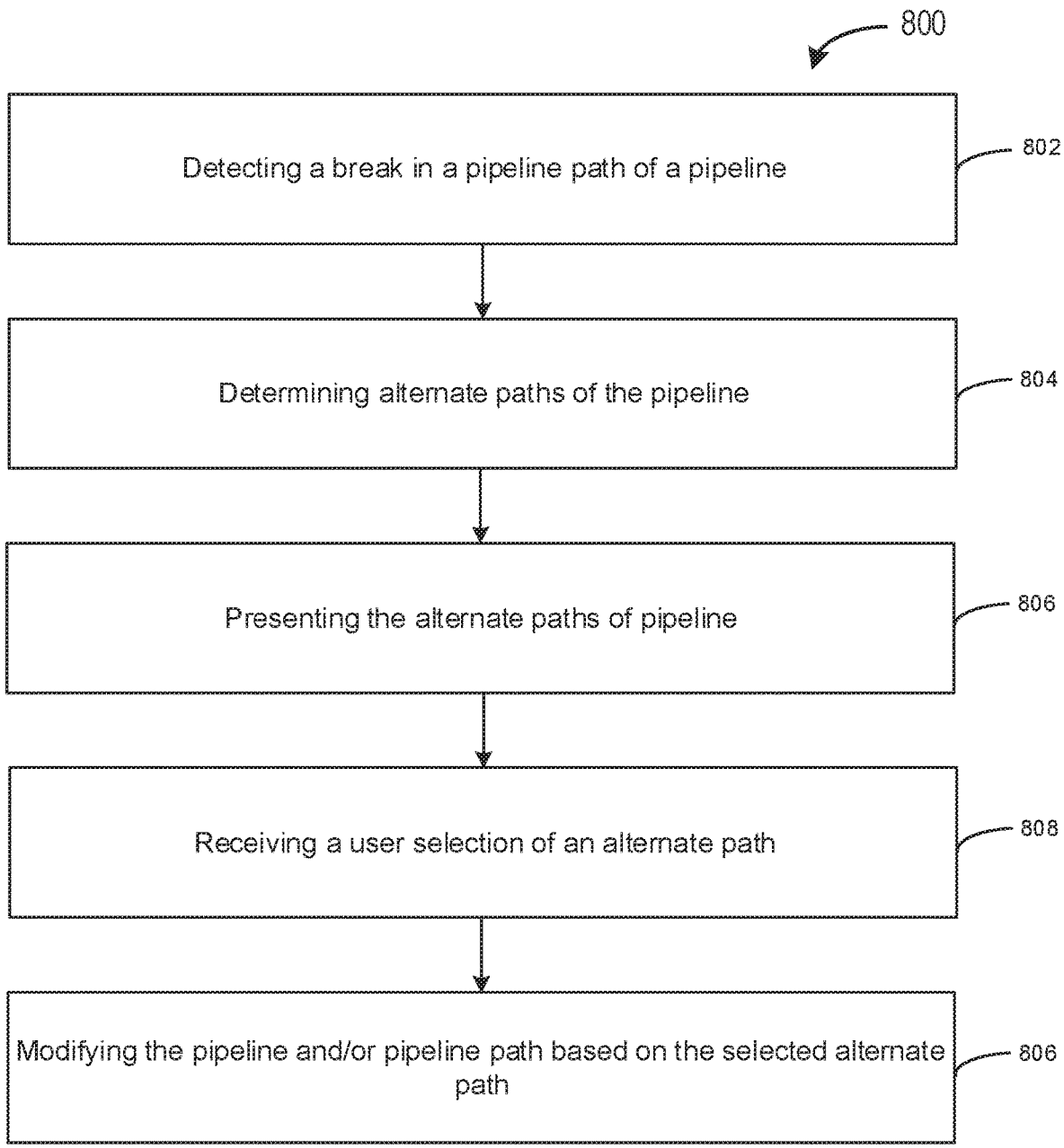
FIG. 8 depicts a flowchart of an example of a method of correcting a break in a pipeline according to some embodiments.

FIG. 8 depicts a flowchart 800 of an example of a method of correcting a break in a pipeline according to some embodiments.

In step 802, a pipeline path system (e.g., pipeline path system 102) detects a break in a particular pipeline path of the data pipeline. The particular pipeline path may be a particular graph pipeline path of the plurality of graph pipeline paths or the linear pipeline path. In some embodiments, a pipeline correction engine (e.g., pipeline correction engine 212) detects the break in the particular pipeline path of the data pipeline.

In step 804, the pipeline path system dynamically determines one or more alternate pipeline paths of the data pipeline. In some embodiments, the pipeline correction engine determines the one or more alternate pipeline paths of the data pipeline.

In step 806, the pipeline path system presents the one or more alternate pipeline paths of the data pipeline. In some embodiments, an interface engine (e.g., graph pipeline interface engine 204 and/or linear pipeline interface engine 206) present the one or more alternate pipeline paths of the data pipeline.

In step 808, the pipeline path system receives a user selection of the particular alternate pipeline path from the one or more alternate pipeline paths of the data pipeline. In some embodiments, the interface engine receives the user selection.

In step 810, the pipeline path system modifies the particular pipeline path of the data pipeline based on the selected one or more alternate pipeline paths of the data pipeline. In some embodiments, the pipeline correction engine modifies the particular pipeline path of the data pipeline.

Hardware Implementation

Figure 9:
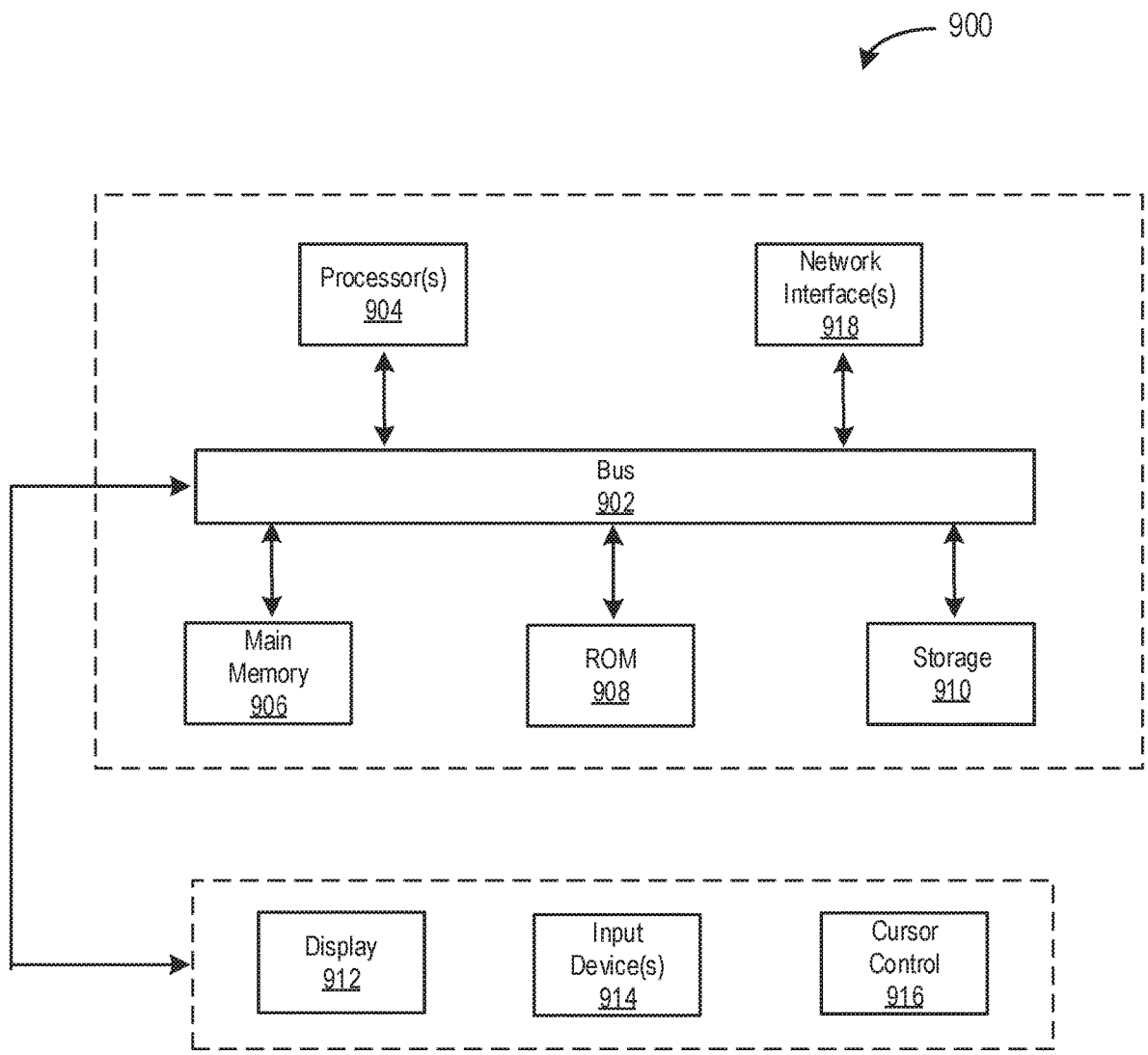
FIG. 9 depicts a diagram of an example computer system for implementing the features disclosed herein.

FIG. 9 depicts a block diagram of an example of a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
   one or more processors; and
   memory storing instructions that, when executed by the one or more processors, cause the system to perform:
      obtaining a data pipeline including a plurality of graph pipeline paths, each of the plurality of graph pipeline paths including a plurality of pipeline nodes, at least one pipeline node of the plurality of pipeline nodes having at least two inputs, each of the at least two inputs comprising outputs of two or more other pipeline nodes of the plurality of pipelines nodes;
      providing a linear pipeline path interface for creating and presenting a linear pipeline path of the data pipeline, the linear pipeline path including a plurality of pipeline nodes, each of the plurality of pipeline nodes being limited to a single input and a single output, the linear pipeline path interface being limited to interacting with linear pipeline paths, wherein the linear pipeline path interface comprises a first graphical user interface, and wherein the plurality of pipeline nodes of the of the linear pipeline path are configured to receive one or more out-of-path inputs in addition to the single input;
      providing a graph pipeline interface for presenting and modifying at least a portion of the data pipeline, the at least a portion of the data pipeline including at least one graph pipeline path of the plurality of graph pipeline paths and the linear pipeline path, wherein the graph pipeline interface comprises a second graphical user interface;
      switching from the linear pipeline path interface to the graph pipeline interface in response to a first user input received through the first graphical user interface; and
      providing a mini-map interface presenting a scaled-down representation of a portion of the data pipeline corresponding to a portion of the linear pipeline path.

2. The system of claim 1, wherein the instructions further cause the system to perform:
   detecting a break in a particular pipeline path of the data pipeline, the particular pipeline path being a particular graph pipeline path of the plurality of graph pipeline paths or the linear pipeline path;
   dynamically determining one or more alternate pipeline paths of the data pipeline;
   modifying the particular pipeline path of the data pipeline based on the one or more alternate pipeline paths of the data pipeline.

3. The system of claim 1, wherein the instructions further cause the system to perform:
   presenting the one or more alternate pipeline paths of the data pipeline;
   receiving a user selection of the particular alternate pipeline path from the one or more alternate pipeline paths of the data pipeline.

4. The system of claim 1, wherein the instructions further cause the system to
   provide a preview any of one or more datasets of a particular node of the linear pipeline path or one or more operations of the particular node of the linear pipeline path in response to a second user input associated with the particular node.

5. The system of claim 1, wherein the instructions further cause the system to
   provide an enhanced linear pipeline path interface including the linear pipeline path interface and the mini-map interface.

6. The system of claim 5, wherein the instructions further cause the system to perform:

receiving a third user input indicating a particular out-of-path input for the particular node of the linear pipeline path, the particular out-of-path input comprising an output of a node in a different linear pipeline path or graph pipeline path of the data pipeline.

7. A method being implemented by a computing system including one or more physical processors and storage media storing machine-readable instructions, the method comprising:
obtaining a data pipeline including a plurality of graph pipeline paths, each of the plurality of graph pipeline paths including a plurality of pipeline nodes, at least one pipeline node of the plurality of pipeline nodes having at least two inputs, each of the at least two inputs comprising outputs of two or more other pipeline nodes of the plurality of pipelines nodes;
providing a linear pipeline path interface for creating and presenting a linear pipeline path of the data pipeline, the linear pipeline path including a plurality of pipeline nodes, each of the plurality of pipeline nodes being limited to a single input and a single output, the linear pipeline path interface being limited to interacting with linear pipeline paths, wherein the linear pipeline path interface comprises a first graphical user interface, and wherein the plurality of pipeline nodes of the of the linear pipeline path are configured to receive one or more out-of-path inputs in addition to the single input;
providing a graph pipeline interface for presenting and modifying at least a portion of the data pipeline, the at least a portion of the data pipeline including at least one graph pipeline path of the plurality of graph pipeline paths and the linear pipeline path, wherein the graph pipeline interface comprises a second graphical user interface;
switching from the linear pipeline path interface to the graph pipeline interface in response to a first user input received through the first graphical user interface; and
providing a mini-map interface presenting a scaled-down representation of a portion of the data pipeline corresponding to a portion of the linear pipeline path.

8. The method of claim 7, wherein the instructions further cause the system to perform:
detecting a break in a particular pipeline path of the data pipeline, the particular pipeline path being a particular graph pipeline path of the plurality of graph pipeline paths or the linear pipeline path;
dynamically determining one or more alternate pipeline paths of the data pipeline;
modifying the particular pipeline path of the data pipeline based on the one or more alternate pipeline paths of the data pipeline.

9. The method of claim 7, wherein the instructions further cause the system to perform:
presenting the one or more alternate pipeline paths of the data pipeline;
receiving a user selection of the particular alternate pipeline path from the one or more alternate pipeline paths of the data pipeline.

10. The method of claim 7, wherein the instructions further cause the system to
provide a preview any of one or more datasets of a particular node of the linear pipeline path or one or more operations of the particular node of the linear pipeline path in response to a second user input associated with the particular node.

11. The method of claim 7, wherein the instructions further cause the system to provide an enhanced linear pipeline path interface including the linear pipeline path interface and the mini-map interface.

12. The method of claim 11, wherein the instructions further cause the system to perform:
receiving a third user input indicating a particular out-of-path input for the particular node of the linear pipeline path, the particular out-of-path input comprising an output of a node in a different linear pipeline path or graph pipeline path of the data pipeline.

13. A non-transitory computer readable medium comprising instructions that, when executed, cause one or more processors to perform:
obtaining a data pipeline including a plurality of graph pipeline paths, each of the plurality of graph pipeline paths including a plurality of pipeline nodes, at least one pipeline node of the plurality of pipeline nodes having at least two inputs, each of the at least two inputs comprising outputs of two or more other pipeline nodes of the plurality of pipelines nodes;
providing a linear pipeline path interface for creating and presenting a linear pipeline path of the data pipeline, the linear pipeline path including a plurality of pipeline nodes, each of the plurality of pipeline nodes being limited to a single input and a single output, the linear pipeline path interface being limited to interacting with linear pipeline paths, wherein the linear pipeline path interface comprises a first graphical user interface, and wherein the plurality of pipeline nodes of the of the linear pipeline path are configured to receive one or more out-of-path inputs in addition to the single input;
providing a graph pipeline interface for presenting and modifying at least a portion of the data pipeline, the at least a portion of the data pipeline including at least one graph pipeline path of the plurality of graph pipeline paths and the linear pipeline path, wherein the graph pipeline interface comprises a second graphical user interface;
switching from the linear pipeline path interface to the graph pipeline interface in response to a first user input received through the first graphical user interface; and
providing a mini-map interface presenting a scaled-down representation of a portion of the data pipeline corresponding to a portion of the linear pipeline path.

14. The non-transitory computer readable medium of claim 13, wherein the instructions further cause the system to perform:
detecting a break in a particular pipeline path of the data pipeline, the particular pipeline path being a particular graph pipeline path of the plurality of graph pipeline paths or the linear pipeline path;
dynamically determining one or more alternate pipeline paths of the data pipeline;
modifying the particular pipeline path of the data pipeline based on the one or more alternate pipeline paths of the data pipeline.

15. The non-transitory computer readable medium of claim 13, wherein the instructions further cause the system to perform:
presenting the one or more alternate pipeline paths of the data pipeline;
receiving a user selection of the particular alternate pipeline path from the one or more alternate pipeline paths of the data pipeline.

* * * * *